Patented Sept. 7, 1948

2,448,873

UNITED STATES PATENT OFFICE 2,448,873

PHENOXYETHYL LACTATE AND A CELLULOSE COMPOUND PLASTICIZED THEREWITH

Martin L. Fein, Riverside, N. J., and Charles H. Fisher, Abington, Pa., assignors to the United States of America as represented by the Secretary of Agriculture No Drawing. Application April 17, 1945, Serial No. 588,882

9 Claims. (Cl. 106—179)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to plastic compositions, and the general object thereof is to produce compositions of matter which may be made into permanently strong and flexible sheets or films of any desired thickness and which are flexible at low temperatures.

Another object of this invention is to provide plastic compositions which do not undergo appreciable change in properties over wide ranges of temperature.

A further object is to provide suitable plasticizers for use with ethyl cellulose, cellulose ethers, cellulose esters, and similar derivatives of carbohydrates of high molecular weight.

A still further object is to provide soft, flexible and extensible composition of matter which can be rolled, extruded, molded or otherwise worked into useful articles of manufacture.

We have found that the esters of hydroxy acids and alcohols having an ether group are useful plasticizers and modifiers for cellulose derivatives. We have found also that esters of lactic acid, acyloxypropionic acids and ether alcohols, such as beta-ethoxyethyl lactate, chloroethoxyethyl lactate, and beta-butoxyethyl acetoxypropionate, are useful plasticizers for ethyl cellulose and similar carbohydrate derivatives. Many of the plastic compositions prepared from these esters and ethyl cellulose are flexible and rubbery, and these properties are maintained at low temperatures. The plastic compositions containing cellulose esters are generally harder than the modified cellulose ethers.

For the manufacture of the plastic compositions of this invention, the carbohydrate derivative and plasticizer may be dissolved in solvents such as acetone, toluene, or ethylene dichloride, and the solvent allowed to evaporate. Another method comprises mixing the carbohydrate derivative and lactic ester by milling or mechanical methods. The products may be extruded and molded, or the solutions may be applied and the solvent allowed to evaporate. Fillers, dyes, extenders, and pigments may be included, if desired.

The viscosity of the ethyl cellulose which can be used is not critical and may be within a wide range, although, in general, we prefer to use a comparatively high viscosity type. Other ethers may be used instead of ethyl cellulose. Various esters of cellulose, starch, and pectin also can be used in preparing plastic compositions in accordance with this invention, including cellulose acetate and cellulose acetate butyrate.

Many ether alcohols and several hydroxy acids or acyloxy acids may be used in preparing the ether esters which may be used as plasticizers for carbohydrate derivatives. Among the ether alcohols are the beta-alkoxy or beta-aryloxy ethanols, beta-alkoxy alkanols, monoalkyl or monoaryl ethers of diethylene glycol, chloroalkoxy alkanols, and cyclic ether alcohols. The ether esters may be used with the cellulose derivatives in various proportions, but, in general, we prefer to prepare compositions containing 15 percent to 60 percent by weight of the plasticizer.

The following is a list illustrating the type of alcohols which may be used:

Beta-methoxyethanol or methyl cellosolve ($CH_3OCH_2CH_2OH$)

Beta-ethoxyethanol or ethyl cellosolve ($CH_3CH_2OCH_2CH_2OH$)

Beta-butoxyethanol or butyl cellosolve ($CH_3(CH_2)_3OCH_2CH_2OH$)

Beta-propoxyethanol or isopropyl cellosolve (($CH_3)_2CHOCH_2CH_2OH$)

Beta-chloroethoxyethanol or diglycol chlorohydrin ($ClCH_2CH_2OCH_2CH_2OH$)

2-Ethylhexoxyethanol or ethylhexyl cellosolve ($CH_3(CH_2)_3CH(C_2H_5)CH_2OCH_2CH_2OH$)

Beta-phenoxyethanol or phenyl cellosolve ($C_6H_5OCH_2CH_2OH$)

Benzyloxyethanol or benzyl cellosolve ($C_6H_5CH_2OCH_2CH_2OH$)

Monomethyl ether of diethylene glycol or methyl carbitol ($CH_3OCH_2CH_2OCH_2CH_2OH$)

Monoethyl ether of diethylene glycol or carbitol ($C_2H_5OCH_2CH_2OCH_2CH_2OH$)

n-Butyl ether of diethylene glycol or n-butyl carbitol ($C_4H_9OCH_2CH_2OCH_2CH_2OH$)

EXAMPLE 1

*Butoxyethyl lactate by direct esterification.*—One mole of 81.8 percent lactic acid (110 grams) in aqueous solution was refluxed with 75 ml. of benzene under a Vigreux column (200 mm. long) which supported a moisture trap (Barrett modification of the Dean and Stark tube). After about 20 cc. of water had been removed, 4 moles of beta-butoxyethanol (472 grams) and 1 cc. of concentrated $H_2SO_4$ were added. After continuing the refluxing as described above for about 10 hours, a total of 24 cc. of water was removed. When the flask had cooled, 4 g. of anhydrous sodium acetate was added to neutralize the catalyst. The benzene present was distilled at about 30 mm. The excess alcohol was removed by distillation at 51° C. under a pressure of 4 mm. The desired product was distilled at 107° to 108° at 4 mm.; $N_D^{20}=1.4320$. The yield was 154 g. or 81 percent of the theoretical.

EXAMPLE 2

*Tetrahydrofurfuryl lactate by direct esterification.*—Same as Example 1, except no catalyst was added, and 4 moles (408 g.) of tetrahydrofurfuryl alcohol instead of the beta-butoxyethanol was added to the flask containing the lactic acid from which about 20 cc. of water had been removed. 22 cc. of water had collected in the trap during the 10 hours of refluxing. Benzene was removed by distillation at atmospheric pressure. The excess alcohol was distilled at 56° to 59° (4 to 5 mm.). The product (136 g., 79 percent of the theoretical) was collected at 114° to 115° (5 mm.).

EXAMPLE 3

*Ethoxyethyl lactate by alcoholysis.*—The reaction mixture contained one mole (118 g.) of redistilled ethyl lactate, 4 moles (360 g.) of redistilled ethoxyethanol, and a small quantity of the aluminum alcoholate of ethoxyethanol. The catalyst was prepared as follows: About four square inches of aluminum foil was dipped in mercury, and the surface of the foil was rubbed gently. It was removed from the mercury before much amalgamation occurred. The aluminum was then placed in a small flask containing about 90 g. of ethoxyethanol, and the flask was heated to gentle boiling until the foil dissolved. The catalyst prepared in this manner was added, when cool, to a round-bottom distillation flask which contained one mole of ethyl lactate and 3 moles of the alcohol. Using a Vigreux column 60 cm. high, the mixture was distilled with a high reflux ratio to remove ethanol as it was formed in the reaction. A small amount of freshly prepared catalyst was added after about each eight-hour interval. The reaction mixture became cloudy as the reaction progressed. The distillation time required to remove 45 cc. of ethanol was about 20 hours. At this point, the distillation temperature rose to that of ethoxyethanol, and the excess of this reactant was removed. The material remaining in the flask was distilled under vacuum; 117 grams of product, distilling between 87° to 90° C. at 5 mm., was collected. The index of refraction of the product was 1.4284 at 20° C., and the yield was 72 percent of the theoretical.

EXAMPLE 4

*Tetrahydrofurfuryl lactate by alcoholysis.*—Same as Example 3, except: The reaction mixture comprised one mole (118 g.) of ethyl lactate, 4 moles of tetrahydrofurfuryl alcohol (408 g.) and the aluminum alcoholate of this alcohol (prepared from a portion of the 4 moles). Distillation under a high reflux ratio for 10 hours yielded 49 cc. of ethanol. The distillation was then carried out in a vacuum, first for the removal of the excess alcohol (60°–61° C. at 6–7 mm.) and then at 110° (4 mm.) to collect the product. The product (145 g. or 84 percent of the theoretical) had an index of refraction of 1.4555 at 25° C.

In Example 1, water was distilled from the 81.8 percent lactic acid before the ether alcohol was added. It is not necessary to do this since the alcohols may be added directly to the lactic acid.

Similar compositions of matter may be formed by the use of various reactants in accordance with the methods illustrated above. The results obtained by the use of various other reactants are given in the following table:

TABLE A

*Preparation of lactic esters*

| Reactants | | Yield, percent (based on lactic acid) | Boiling Point, °C. | Pressure, mm. | $N_D^{20}$ |
|---|---|---|---|---|---|
| A, moles | B, moles | | | | |
| Carbitol, 4 | Lactic acid, 1 | 39 | 104–106 | 2+ | 1.4450 |
| Do | do | 47 | 108–118 | 3–4 | 1.4440 |
| Do | do | 45 | 91 | 0.8 | 1.4440 |
| Do | Ethyl lactate,[1] 1 | 55 | 103–104 | 2+ | 1.4444 |
| Methyl carbitol, 4 | Lactic acid, 1 | 55 | 101 | 1–2 | 1.4420 |
| Do | do | 60 | 89–90 | 0.8 | 1.4424 |
| Do | Ethyl lactate,[1] 1 | 71 | 95–98 | 1–2 | 1.4410 |
| Butyl carbitol, 4 | Lactic acid, 1 | 63 | 119 | 1–2 | 1.4400 |
| Do | Ethyl lactate,[1] 1 | 81 | 120–121 | 1–2 | 1.4400 |
| Benzyl Cellosolve, 4 | Lactic acid, 1 | 53 | 134 | 1–2 | 1.5033 |
| Do | do | 50 | 130–145 | 3 | 1.5028 |
| Do | Ethyl lactate,[1] 1 | 56 | 147–151 | 4 | |
| Phenyl Cellosolve, 4 | Lactic acid, 1 | 63 | 125–130 | 1.5 | 1.5147 |
| Do | Ethyl lactate,[1] 1 | 50 | 121 | 1.4 | 1.5145 |
| 2-ethylhexyl Cellosolve, 4 | Lactic acid, 1 | 55 | 100 | 0.2 | 1.4408 |
| Do | Ethyl lactate,[1] 1 | 75 | 106 | 1 | 1.4408 |
| Chloroethoxyethyl Cellosolve, 4 | Lactic acid, 1 | 79 | 111 | 1.6 | 1.4568 |
| Do | Ethyl lactate,[1] 1 | 79 | 120 | 2.4 | 1.4565 |
| Isopropyl Cellosolve, 3 | Lactic acid, ½ | 40 | 83 | 3 | 1.4277 |
| Isopropyl Cellosolve, 2 | Ethyl lactate,[1] ½ | 80 | 60–68 | 0.1 | 1.4278 |

[1] Ester interchange reaction; catalyst: 2 g. aluminum isopropoxide.

EXAMPLE 5

*Acetylation of the lactic esters.*—The method consists of acetylating the lactate (1 mole) with a 10 per cent excess of acetic anhydride. The lactic ester may be placed in a flask, such as a three-neck flask fitted with a condenser, a motor-driven stirrer (liquid petrolatum seal) and a thermometer, and the acetic anhydride containing sulfuric acid (3 drops to 1 ml.) added slowly, in small quantities, through the condenser. By controlling the addition rate of the anhydride, the reaction temperature may be kept below 90° C. with no difficulty. Stirring of the mixture is continued for about ½ hour after the addition of all the anhydride. Sufficient anhydrous sodium acetate to neutralize the catalyst is then added. The acetic acid may be distilled at either atmospheric or reduced pressures, and the acetyl derivatives may be distilled under various pressures as indicated in Table B, below.

As also indicated in Table B, n-butyric anhydride or n-butyryl chloride may be used as the acylating agent instead of acetic anhydride.

TABLE B
*Acylation of lactic esters*

| Lactic ester | Acylating agent | Acyloxypropionate | | |
|---|---|---|---|---|
| | | Boiling Point, °C. | Pressure, mm. | $n_D^{20}$ |
| Methyl Cellosolve | Acetic anhydride | 100–1 | 7 | 1.4218 |
| Ethyl Cellosolve | do | 105–6 | 6 | 1.4220 |
| Butyl Cellosolve | do | 120–1 | 5 | 1.4259 |
| Phenyl Cellosolve | do | 129–30 | 0.3 | 1.4944 |
| Benzyl Cellosolve | do | 130–3 | 0.4 | 1.4870 |
| Ethylhexyl Cellosolve | do | 122 | 0.9 | 1.4349 |
| Chloroethyl Cellosolve | do | 128 | 2.0 | 1.4450 |
| Isopropyl Cellosolve | do | 95.5 | 2.8 | 1.4210 |
| Methyl carbitol | do | 85–95 | 0.2 | 1.4340 |
| Ethyl carbitol | do | 84–95 | 0.2 | 1.4363 |
| Butyl carbitol | do | 124–7 | 1.2–1.5 | 1.4335 |
| Tetrahydrofurfuryl | do | 139 | 10 | 1.4440 |
| Do | Butyric anhydride | 110 | 0.7 | 1.4443 |
| Do | Butyryl chloride | 97 | 0.2 | 1.4448 |
| Benzyl Cellosolve lactate | do | 160–164 | 0.8 | 1.4822 |

When an excess of alcohol is used in the esterification of lactic acid, the principal product is the corresponding ester of monomeric lactic acid. The examples given below illustrate the preparation of esters of dimeric lactic acid or trimeric lactic acid by reacting one mole of the alcohol with two or more moles of lactic acid. In general, the method is similar to that of Example 1, except that the alcohol is added directly to the 81.8% lactic acid, the esterification catalyst is omitted, and distillation is not carried beyond the removal of the entraining agent (benzene). The resulting distillation residues may be treated with decolorizing carbon to decrease the color. However, this treatment is not normally necessary. The resulting products may be considered as consisting primarily of esters of lactic acid dimers, trimers, and higher polymers of lactic acid. The dimeric and trimeric lactic acid esters may be represented, respectively, as follows:

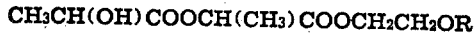

CH₃CH(OH)COOCH(CH₃)COOCH₂CH₂OR

CH₃CH(OH)COOCH(CH₃)

COOCH(CH₃)COOCH₂CH₂OR where R is an alkyl or aryl group. Specific examples of such esters made in accordance with the process described above are given in the following table:

TABLE C
*Esters of dimeric and trimeric lactic acid* [1]

| Alcohol, moles | Lactic acid, moles | Water removed by distillation, ml. | Compatibility | |
|---|---|---|---|---|
| | | | Ethyl cellulose | Cellulose acetate |
| Butyl carbitol, 1 | 2 | 72.5 | ‡ | ‡ |
| Phenyl cellosolve, 1 | 2 | 71.0 | ‡ | ‡ |
| Benzyl cellosolve, 1 | 2 | 72.0 | ‡ | ‡ |
| Terposol No. 8 (terpene ether of glycol), 1 | 2 | 72.5 | + | + |
| Beta-(p-tert. butylphenoxy) ethanol, 1 | 2 | 72.0 | ‡ | ‡ |
| Butyl cellosolve, 0.75 | 4 | 141.5 | ‡ | ‡ |
| Tetrahydrofurfurylalcohol, 1 | 3 | 112.0 | ‡ | ‡ |
| Do | 2 | 72.0 | ‡ | ‡ |
| Do | 5 | 184.5 | ‡ | ‡ |

[1] Esters were made from 81.8% lactic acid.

The compatibility of the compounds in Tables A, B, and C is illustrated by the following examples:

EXAMPLE 6

*Ethyl cellulose.*—The plasticizer and an equal part by weight of ethyl cellulose were dissolved in acetone. The acetone solution was poured into a flat dish and allowed to evaporate. Transparent, colorless films resulted.

EXAMPLE 7

*Cellulose acetate.*—Plasticized cellulose acetate films were similarly prepared from 4.8 parts cellulose acetate and 1.2 parts by weight of plasticizer, using 90% acetone—10% methanol as solvent.

All the esters of Tables A, B, and C are compatible with ethyl cellulose in equal proportions, except butyl cellosolve lactate and ethyl carbitol lactate, which are compatible when considerably less plasticizer is used. These two esters may also be used satisfactorily as plasticizers in admixture with other esters, such as methyl phthalate and butyl phthalate.

All the compounds shown in Tables A, B, and C are compatible with cellulose acetate, with the exception of 2-ethylhexyl cellosolve acetoxypropionate.

The esters given in the above tables are also useful to plasticize vinyl resins, synthetic rubbers, and other materials of high molecular weight. They can be used as solvents, those of relatively low molecular weight usually being preferred, and as insecticides and repellents against mosquitoes and other pests.

Having thus described our invention, we claim:

1. Beta-phenoxyethyl lactyllactate.
2. Beta - tertiary - butylphenoxyethyl lactyllactate.
3. An ester of a polylactic acid corresponding to the formula:

CH₃CH(OH)COO—CH(CH₃)—

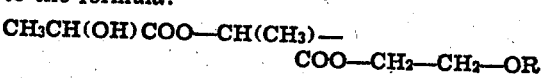

COO—CH₂—CH₂—OR where R is a lower alkyl substituted phenyl radical.

4. A plastic composition essentially consisting of a cellulose derivative taken from the group consisting of cellulose ethers and esters; and an ester of a polylactic acid of the formula:

CH₃CH(OH)COO—CH(CH₃)—

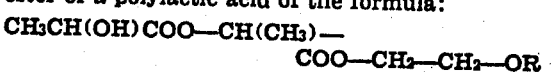

COO—CH₂—CH₂—OR where R is a lower alkyl substituted phenyl radical; the said polylactic acid ester being present in an amount to plasticize the cellulose derivative.

5. An ester of a polymeric lactic acid which has a total of no more than three lactyl groups and an alcohol of the group consisting of phenoxyethanol and phenoxyethanol substituted on the phenyl nucleus by a lower alkyl group.

6. A plastic composition essentially consisting of a cellulose derivative taken from the group consisting of cellulose ethers and esters; and an ester of a polymeric lactic acid which has a total of no more than three lactyl groups and an alcohol taken from the group consisting of phenoxyethanol and phenoxyethanol substituted on the phenyl nucleus by a lower alkyl group; the ester of the acid being present in an amount to plasticize the cellulose derivative.

7. The composition described in claim 6 in which the alcohol is phenoxyethanol.

8. The composition described in claim 6 in which the alcohol is phenoxyethanol substituted on the phenyl nucleus by a lower alkyl group.

9. The composition described in claim 6 in which the alcohol is beta-tertiary butyl-phenoxyethanol.

MARTIN L. FEIN.
CHARLES H. FISHER.

REFERENCES CITED

The following references are of record in the file of this patent:

UNITED STATES PATENTS

| Number | Name | Date |
|---|---|---|
| 1,884,318 | Smith | Oct. 25, 1932 |
| 1,909,195 | Hahn | May 16, 1933 |
| 2,008,716 | Izard | July 23, 1935 |
| 2,046,150 | Cox et al. | June 30, 1936 |
| 2,089,127 | Loch | Aug. 3, 1937 |
| 2,151,185 | Carruthers et al. | Mar. 21, 1939 |
| 2,158,107 | Carruthers et al. | May 16, 1939 |
| 2,222,363 | Claborn | Nov. 19, 1940 |
| 2,260,295 | Carruthers | Oct. 28, 1941 |
| 2,315,168 | Urquhart | Nov. 30, 1943 |
| 2,338,683 | Coleman et al. | June 4, 1944 |
| 2,371,781 | Claborn | Mar. 13, 1945 |
| 2,372,980 | Piech | Apr. 3, 1945 |
| 2,412,699 | Waugh et al. | Dec. 17, 1946 |

OTHER REFERENCES

Burns et al., "Jour. Chem. Soc.," (London), (1935), pages 714 to 717.